United States Patent [19]
Cerutti et al.

[11] 3,936,290
[45] Feb. 3, 1976

[54] NOVEL FLAT GLASS-PRODUCING FURNACE

[75] Inventors: Richard L. Cerutti, Seminole; Henry M. Demarest, Jr., Natrona Heights, both of Pa.

[73] Assignee: PPG Industries, Inc., Pittsburgh, Pa.

[22] Filed: Apr. 8, 1974

[21] Appl. No.: 458,911

[52] U.S. Cl. ............... 65/134; 65/135; 65/337; 65/339; 65/346; 13/6
[51] Int. Cl.² .............. C03B 5/16; C03B 5/22
[58] Field of Search ....... 65/346, 337, 134, 33, 135, 65/339; 63/3

[56] References Cited
UNITED STATES PATENTS

| | | | |
|---|---|---|---|
| 1,820,247 | 8/1931 | Raeder | 65/337 X |
| 2,593,197 | 4/1952 | Rough | 65/134 |
| 3,326,655 | 6/1967 | Penberthy | 65/346 X |
| 3,532,483 | 10/1970 | Cardut | 65/346 X |
| 3,788,865 | 1/1974 | Babcock et al. | 65/33 |
| 3,798,017 | 3/1974 | Classen | 65/346 X |
| 3,809,543 | 5/1974 | Gaskell et al. | 65/33 |
| 3,817,732 | 6/1974 | Pei | 65/33 X |

Primary Examiner—S. Leon Bashore
Assistant Examiner—Frank W. Miga
Attorney, Agent, or Firm—Dennis G. Millman; William J. Uhl

[57] ABSTRACT

A novel tank-type furnace is disclosed for producing flat glass from a glass which has a high melting temperature and which contains highly volatile ingredients. The furnace has a tapered end wall construction leading from the melter into the canal. Such a construction results in the formation of better quality flat glass.

13 Claims, 1 Drawing Figure

U.S. Patent  February 3, 1976  3,936,290
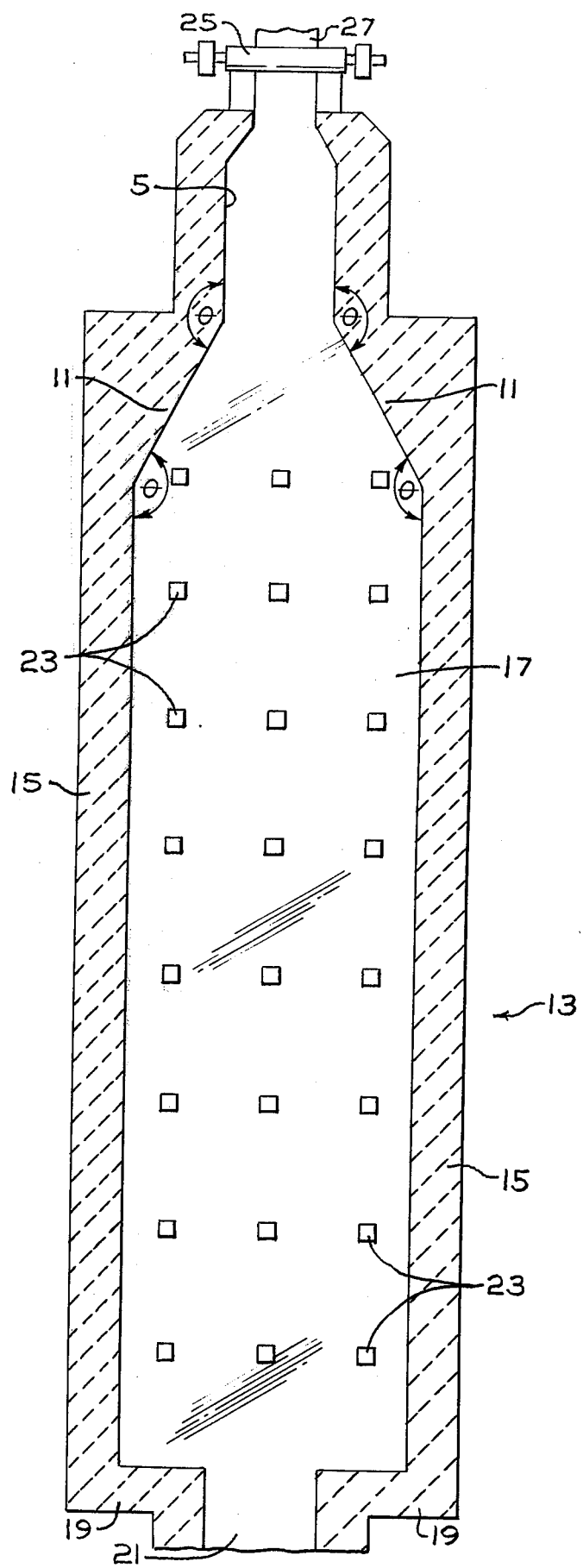

NOVEL FLAT GLASS-PRODUCING FURNACE

BACKGROUND OF THE INVENTION

1. Field of the Invention

This invention relates to tank-type furnaces for producing flat glass. More particularly, this invention relates to a tank-type furnace for producing a flat glass made from a highly volatile, high temperature melting glass composition, such as a crystallizable glass composition.

2. Brief Description of the Prior Art

Crystallizable glasses are a special class of glass which can be heat treated to transform the glass into a semi-crystalline ceramic. The ceramic differs considerably from the original glass in physical, chemical, mechanical and electrical properties. Such ceramics are transparent or opaque and generally have a much lower thermal expansion coefficient than the original uncrystallized glass. These properties make the semi-crystalline product particularly attractive for stove top applications.

U.S. Pat. Nos. 2,920,971 to Stookey and 3,625,718 to Petticrew describe typical crystallizable glass compositions.

Crystallizable glasses which are of particular importance are those which can be transformed into the crystalline phase, beta-spodumene solid solution. Such glasses are made with the alkali metal oxide $Li_2O$ and contain very little of the good fluxing agents $Na_2O$ and $K_2O$, since these latter ingredients adversely affect the expansion coefficient of the resultant crystallized glass product. As a result, the crystallizable glasses have very high melting temperatures, that is, some 200° to 400°F. above that required for melting soda-lime-silica glasses.

To provide some fluxing activity, certain preferred crystallizable glass compositions contain heavy metal oxides such as ZnO. ZnO is a particularly attractive ingredient because it not only acts as a fluxing agent but also acts as a promoter for crystallization acting to increase the rate of crystallization. Also, the ZnO does not adversely affect the expansion coefficient.

Unfortunately, heavy metal oxides such as ZnO are quite volatile at the high temperatures employed in melting crystallizable glass. The high melting temperatures in conjunction with high volatility negates the use of conventional flat glass furnaces which are generally about 150 to 200 feet in overall length. The amount of energy required to keep the glass in the melt form for this long a period of travel would be prohibitive. Also, the loss of volatile constituents over this length of travel would be excessive resulting in a glass deficient in volatile constituents and of poor quality. Thus, shorter furnaces with heat applied across the entire length of the furnace are usually employed.

Producing, in a short furnace, glass which has a high melting temperature and which contains highly volatile ingredients presents quality control problems. As the glass is heated and melted, convection currents are set up in the molten melt; the flow being from the hotter to the cooler regions. Therefore, on the surface of the melt, there is a flow of glass outwardly to the side walls of the tank which act as a heat sink. At the front end of the furnace where the side walls are conventionally at a 90° angle to the front end wall, surface convection currents are particularly strong because of the large side wall-end wall surface area exposure. As a result, a significant portion of the glass throughput stream will be diverted into the corner regions of the furnace rather than through a delivery canal which extends through the front end of the furnace. With conventional soda-lime-silica glasses, the diversion of the glass into the corner regions is not particularly critical, because the glass melts at a fairly low temperature and the glass-making ingredients do not contain any exceptionally volatile constituents. However, with a high temperature melting, highly volatile glass such as a crystallizable glass containing ZnO, diversion of the glass into the corner regions is undesirable. While in these corners, the glass which is at a fairly high temperature, loses its volatile constituents. The glass in the corners becomes less dense and resists any tendency to flow back into the throughput stream (which is more dense). The glass stagnates in the corners becoming more and more deficient in volatile constituents, more and more silica-rich (silica is the least volatile constituent in the glass) and becoming lighter and lighter in density. Eventually, however, as more glass is pulled into the corner areas, some of the silica-rich, volatile component-deficient glass necks out into the throughput stream at the throat of the canal. Consequently, the throughput glass in the canal and the resultantly formed glass ribbon will not be of uniform composition. The upper portions of the edges of the ribbon are of a different composition from the main body of the glass ribbon, being silica-rich and deficient in volatile components. The result is a glass of very poor quality which is optically distorted. The difference in composition of the corners from the main body of the glass can be observed by examining a cross-section of the glass under cross-polaroids. When the glass composition is a crystallizable glass, the above-described problem of ribbon inhomogeneity is particularly acute. When the glass is heat treated to crystallize it, the different compositions across the ribbon result in different rates of crystallization and warpage and cracking of the sheet.

From the above, it is apparent that a new method and furnace design were needed for making high quality flat glass from high temperature melting glass compositions containing highly volatile ingredients.

SUMMARY OF THE INVENTION

The present invention relates to a novel method and furnace design for producing high quality homogeneous flat glass, particularly flat glass made from a high temperature melting glass containing highly volatile ingredients. The novel furnace of the present invention comprises a melter and a canal section. The melter comprises generally parallel side walls, a top and bottom wall defining a channel in which molten glass proceeds from the back end or batch feeding end of the furnace to a front end wall which has an opening therein to permit the glass to flow into a canal which is somewhat narrower than the melter. In the canal, the glass cools to a forming temperature and is then passed between forming rolls to form a ribbon. In the furnace of the present invention, the front end walls, instead of being normal or at right angles to the side walls of the melter, are tapered, converging inwardly towards one another from the width of the side walls to the width of the canal such that the angle the end walls make with the side wall is at least about 140° rather than 90° as is the case with conventional flat glass furnaces. The tapered end wall design provides for more uniform glass flow patterns leading into the canal and for the production of a more homogeneous glass ribbon.

BRIEF DESCRIPTION OF THE DRAWING

The drawing is a sectional plan view of the furnace of the present invention showing tapered front end walls of the melter leading to the canal.

DETAILED DESCRIPTION

The drawing shows a sectional plan view of the novel furnace 13 of the present invention. The furnace is referred to in the art as a tank-type furnace. The furnace 13 includes a top or roof, not shown, opposed generally parallel side walls 15, a bottom or floor 17, all made of a suitable refractory material. The walls define a channel in which molten glass proceeds from the back wall 19 to the front end walls 11.

The glass batch making materials or raw batch is introduced into the charging end 21 of the furnace. Heat for reducing the batch to molten glass is provided by the rows of overhead burners 23 which discharge hot flames and products of combustion down onto the level of molten glass. In all, for a furnace with an overall length of some 40 to 50 feet and a length-to-width ratio of about 4 to 6:1, six to eight rows of burners are needed to melt the glass and keep it in a molten state as it passes from the back end to the front end of the furnace. The batch is usually completely melted by the first few rows of burners. The remaining burners serve to keep the glass molten as it advances through the melting zone. As can be seen in the drawing, the rows of overhead burners extend over substantially the entire length of the furnace. Instead of overhead burners, heating could be by regenerative firing in which ports are positioned or arranged at intervals on both sides of the furnace. Firing is conducted first on one side of the furnace and then on the other.

After the flow of molten glass advances past the last rows of overhead burners, it advances along the tapered end walls 11 being progressively and gradually reduced in cross-section until the glass flows into the relatively narrow canal region 5. The canal is narrower than the melter principally to give a sheet which can be easily handled. In general, the ratio of melter widths to canal widths should be about 2 to 4:1. The molten glass cools in a canal, increasing in viscosity until it is high enough to be formed between forming rolls 25 as a flat glass ribbon 27.

As is shown in the drawing, the front end walls of the furnace are tapered with respect to the side walls 15, and converge inwardly towards one another until they reach the throat of the canal 5. The tapered front end wall construction provides a significant structural and processing advantage over conventional flat glass furnaces which are rectangular having front end walls which are at an angle of 90° to the side walls. With the tapered front wall design, there is less surface area exposed to the molten glass than with a conventional "squared off" front end wall. The situation is analogous to the glass flowing along the hypotenuse of the right triangle as compared to flowing along its two sides. Since there will be less surface area exposed to the molten glass by the tapered end wall, there will be less surface available to act as a heat sink and less of a tendency for the glass to be drawn to the sides of the tank where it can accumulate, stagnate and lose volatiles. By eliminating the corner areas of the furnace, one reduces the area of cooling per unit area of heating and the flow of glass that wants to diverge from the main stream to the sides of the tank is reduced. Instead, more of the throughput glass flows directly into the throat of the canal.

The angle of taper $\theta$ that the end wall makes with the side wall should be at least about 140°, preferably between about 150° to 160°. Also, if the walls of the canal 5 are parallel with the side walls 15 of the furnace, the front end wall makes the same angle $\theta$ with the canal walls. Angles less than 140°, that is, about 135°, are unacceptable. Such angles are too sharp, acting too much as corners which leads to accumulation and stagnation of glass and problems associated therewith as described above.

The location in the furnace where the tapering of the furnace walls begins will depend somewhat on the length-to-width ratio of the furnace and the ratio of the width of the melter to the width of the canal, keeping in mind that the angle of taper should be at least about 140°. In general, with furnaces having length-to-width ratios of about 4 to 6:1 and melter widths to canal widths of about 2 to 4:1, the ratio of a. the furnace distance from the back end wall to the point at which the front end walls begin to converge inwardly to b. the furnace distance from the point at which the end walls begin to converge inwardly to the beginning of the canal should be within the range of 6 to 8:1.

The glass which is melted by the method in the furnace described above can be any high melting, highly volatile glass composition. An example of such a glass is crystallizable glass which contains ZnO, a very volatile glass-making ingredient. Typical crystallizable glass compositions containing ZnO are described in U.S. Pat. No. 3,625,718 to Petticrew. Particularly suitable compositions are as follows:

| Component | Percent by Weight on the Oxide Basis |
|---|---|
| $SiO_2$ | 64 – 74 |
| $Al_2O_3$ | 15 – 23 |
| $Li_2O$ | 3.3 – 4.8 |
| ZnO | 1 – 3.8 |
| $TiO_2$ | 1.2 – 2.4 |
| $ZrO_2$ | 0 – 2 |
| $Sb_2O_3$ | 0 – 0.5 |
| $As_2O_3$ | 0 – 0.5 |
| $Sb_2O_3 + As_2O_3$ | 0.2 – 1.0 |

EXAMPLE I

Description of the Preferred Embodiment

The following well-mixed batch ingredients were charged on a continuous basis to the charging end of a commercial-sized glass melting furnace with a tapered front end wall design according to the present invention.

| Ingredient | Parts by Weight |
|---|---|
| silica | 700 |
| hydrated alumina | 296 |
| lithium carbonate | 83 |
| lithium fluoride | 13.50 |
| titanium dioxide | 6.0 |
| zinc zirconium silicate | 31 |
| zinc oxide | 10.5 |
| antimony trioxide | 4.0 |
| potassium carbonate | 2.5 |
| | 1146.5 |
| Cullet[1] | 1360 |

[1]The glass cullet had the following composition expressed as percent by weight: $Na_2O$, 0.31 percent; $Li_2O$, 3.98 percent; F, 0.27 percent; $SiO_2$, 70.67 percent;

-continued

| Ingredient | Parts by Weight |
|---|---|
| $Al_2O_3$, 19.39 percent; $ZrO_2$, 1.54 percent; ZnO, 1.53 percent; $TiO_2$, 1.56 percent; $K_2O$, 0.18 percent; $As_2O_3$, 0.01 percent; $Sb_2O_3$, 0.33 percent | |

The glass melting furnace was about 47 feet in overall length and had a melting area which was about 8½ feet wide and was capable of holding about 55 tons of glass. The canal section measured about 6 feet from its throat to the forming rolls and was about 3½ feet wide. The front end walls of the furnace were tapered such as generally shown in the drawing. The angle of taper $\theta$ was 150°. The tapered end walls were about 5½ feet in length and extended back about 5 feet into the melter from the throat of the canal. The furnace was designed to hold a depth of about 24 inches of molten glass. The furnace contained eight rows of overhead burners which fired onto the level of the molten glass. Using natural gas firing, the glass was melted for about 24 hours (average residence time) in the furnace. The temperature profile in the furnace was somewhat as follows: At the doghouse, the melt temperature was about 2200°F. At about the third row of burners, a distance of about ⅓ the overall length of the furnace, measured from the back wall, the melt temperature was about 2700°F. At about the fifth row of burners or a distance of about ⅔ the overall length of the furnace, the melt temperature was about 3100°F. From this point to where the glass is removed at the rolls, the glass temperature decreased from a high of about 3100°F. to about 2950°F.

The molten glass was continuously removed from the furnace and formed between a pair of high temperature-resistant alloyed water-cooled rolls. The rolls were set against the delivery lip of the tank so that the glass was forced into the pinch of the rolls and thus squeezed to the desired thickness in the form of a continuously formed ribbon. As the glass passes from the water-cooled rolls, the surfaces had sufficiently chilled to form a more or less self-sustaining sheet or ribbon, even though the body of the glass is still very hot.

The formed sheet was picked up on smaller apron rolls, which were actually a part of an annealing lehr mechanism but were not enclosed as was the rest of the lehr. In this area, the glass lost heat rapidly and the temperature fell to about 2300°F. leaving the rolls to about 1500°F. entering the lehr. In the lehr, the glass was annealed to release thermal strains which were introduced into the glass by forming. After annealing, the glass was inspected and cut to size. The glass at this stage had a nominal thickness of about 0.2 inch and had the following composition:

| Component | Percent by Weight |
|---|---|
| $SiO_2$ | 70.50 |
| $Al_2O_3$ | 19.20 |
| $Li_2O$ | 3.98 |
| $TiO_2$ | 1.60 |
| $ZrO_2$ | 1.50 |
| ZnO | 1.60 |
| $Sb_2O_3$ | 0.35 |
| $As_2O_3$ | 0.01 |
| F | 0.28 |

The glass was of excellent quality and when a cross-section of the glass was examined under cross-polaroids, was considered to have a uniform composition throughout the thickness of the ribbon, that is, there were no gross differences in composition on the edge of the ribbon as opposed to the main body of the ribbon. This uniformity of composition was substantiated when the glass was transferred to a kiln for crystallizing heat treatment. The glass was crystallized and became opaque and milky white in appearance and X-ray analysis indicated that the heat treated glass was a glass-ceramic with the principal crystal phase being betaspodumene solid solution and the extent of crystallization being about 98 percent. The glass crystallized uniformly and there was no evidence of cracking or warping.

We claim:

1. In a continuous tank-type furnace producing flat glass of high temperature melting, highly volatile glass batch making ingredients comprising a melter, a canal and flat glass forming means, said melter comprising:
  a. a back end wall and front end walls,
  b. a top and bottom wall, two generally parallel side walls which define a channel in which the molten glass proceeds from the back wall to the front end walls, said front end walls having an opening therethrough to permit the passage of glass to flow into the canal which has a narrower cross-section than the melter, the improvement comprising tapered front end walls converging inwardly towards one another from the width of the melter to the width of the canal, such that the angle the front end walls make with the side walls is at least about 140°.

2. The furnace of claim 1 in which the angle the front end walls make with the side walls is within the range of 150° to 160° inclusive.

3. The furnace of claim 1 which has heaters along substantially the entire length of the melter.

4. The furnace of claim 3 in which the heaters are overhead burners.

5. The furnace of claim 4 which has a length-to-width ratio in the melter within the range of 4 to 6:1.

6. The furnace of claim 5 which has a melter width to canal width ratio within the range of 2 to 4:1.

7. The furnace of claim 6 in which the ratio of
  a. the furnace distance from the back end wall to the point at which the front end walls begin to converge inwardly to
  b. the furnace distance from the point at which the end walls begin to converge inwardly to the beginning of the canal is within the range of 6 to 8:1.

8. A method of making glass comprising:
  introducing into a melting zone a glass batch containing an ingredient which is volatile at the elevated temperatures required for melting over a prolonged time so as to cause an adverse loss of said ingredient from the glass, said melting zone having an initial portion thereof defined by spaced substantially parallel boundaries extending toward a molten glass outlet,
  heating said glass batch until it is in a molten state,
  flowing said molten glass through said initial portion of said melting zone toward the end of the melting zone and said molten glass outlet along a substantially straight linear path of flow, and applying forces to said flowing molten glass at the terminal end of each said boundary of the initial portion of said melting zone and maintaining said forces so as to divert and constrict the flow of molten glass to said outlet, said forces being sufficient to divert the flow of the molten glass at each side edge thereof along lines of flow forming an angle of at least about 140° with the line of flow of the molten glass along the edge thereof at the adjacent boundary of said melting zone, whereby to streamline the flow of portions of the molten glass along said side edges and thereby decrease the average residence time of said glass portion and decrease the loss of volatilizable components of the molten glass.

9. The method of claim 8 in which the advancing flow of glass is continuously heated by heaters as it advances through the melter.

10. The method of claim 9 in which the heating is from overhead burners.

11. The method of claim 8 wherein said application of forces is sufficient to reduce the width of the glass flow to one half to one fourth the width of flow through the initial portion of said melting zone.

12. The method of claim 8 wherein said step of introducing batch ingredients into a melting zone includes introducing ZnO as a component of the batch.

13. The method of claim 12 wherein molten glass is withdrawn through said outlet with the following composition:

| COMPONENT | PERCENT BY WEIGHT ON THE OXIDE BASIS |
|---|---|
| $SiO_2$ | 64–74 |
| $Al_2O_3$ | 15–23 |
| $Li_2O$ | 3.3–4.8 |
| ZnO | 1–3.8 |
| $TiO_2$ | 1.2–3.0 |
| $ZrO_2$ | 0–2. |

* * * * *